United States Patent [19]

Perrillat-Amede

[11] Patent Number: 5,213,307
[45] Date of Patent: May 25, 1993

[54] GASTIGHT MANUALLY-OPERATED VALVE

[75] Inventor: Denis Perrillat-Amede, Annecy le Vieux, France

[73] Assignee: ALCATEL CIT, Paris, France

[21] Appl. No.: 797,035

[22] Filed: Nov. 25, 1991

[30] Foreign Application Priority Data

Nov. 26, 1990 [FR] France ................ 90 14751

[51] Int. Cl.⁵ .................................... F16K 31/08
[52] U.S. Cl. ............................ 251/65; 335/306
[58] Field of Search .................. 251/65; 335/306

[56] References Cited

U.S. PATENT DOCUMENTS

| | | | |
|---|---|---|---|
| 2,289,574 | 7/1942 | Carlson | 251/65 |
| 2,536,813 | 1/1951 | Jones et al. | 251/65 |
| 2,589,188 | 3/1952 | De Craene et al. | 251/65 |
| 2,609,669 | 9/1953 | Eddy | 62/1 |
| 2,700,395 | 1/1955 | Young | 251/65 |
| 2,792,194 | 5/1957 | Huck | 251/65 |
| 3,355,140 | 11/1967 | Andersen | 251/65 |
| 3,774,878 | 11/1973 | Martinez | 251/65 |
| 4,274,444 | 6/1981 | Ruyak | 251/65 |
| 4,284,262 | 8/1981 | Ruyak | 251/65 |
| 4,327,892 | 5/1982 | Ruyak | 251/65 |
| 4,452,423 | 6/1984 | Beblavi et al. | 251/65 |
| 4,671,486 | 6/1987 | Giannini | 251/65 |

FOREIGN PATENT DOCUMENTS

| | | |
|---|---|---|
| 2028591 | 2/1971 | Fed. Rep. of Germany . |
| 3014692 | 11/1980 | Fed. Rep. of Germany . |
| 2051096 | 4/1971 | France . |
| 2456892 | 12/1980 | France . |
| 0172076 | 7/1988 | Japan ............................. 251/65 |

Primary Examiner—George L. Walton
Attorney, Agent, or Firm—Sughrue, Mion, Zinn, Macpeak & Seas

[57] ABSTRACT

A gastight manually-operated valve comprising a cylindrical valve body including a first orifice and a second orifice, and containing a piston valve-member that is prevented from rotating but that is free to move axially between a closed position closing said first orifice and an open position providing free communication between said first orifice and said second orifice, wherein said body is provided with a control ring surrounding the outside of the valve body, prevented from moving axially, and free to move in rotation, both said control ring and said piston valve member being fitted with at least one pair of axially polarized permanent magnets, with the two magnets in each pair being polarized in opposite directions to each other and extending respectively on two diametrically opposite generator lines of the body or valve member part carrying them.

6 Claims, 2 Drawing Sheets

GASTIGHT MANUALLY-OPERATED VALVE

The present invention relates to a gastight manually-operated valve comprising a cylindrical valve body including a first orifice and a second orifice, and containing a piston valve-member that is prevented from rotating but that is free to move axially between a closed position closing said first orifice and an open position providing free communication between said first orifice and said second orifice.

Such a valve is used, for example, in vacuum circuits or in gas circuits, e.g. as an air inlet valve or as a safety valve on pipework, etc.

BACKGROUND OF THE INVENTION

In a known manually controlled valve of this type, the translation motion of the valve member is controlled by a control screw which passes through a tapped hole formed in the end face opposite to said first orifice and connected to the valve member by a circular "head" which is held in a T-shaped groove in the valve member, with the other end of the screw having a drive head. The valve body is made gastight by a metal bellows connecting the piston valve member to the end face of the valve through which said control screw passes.

Such a valve is driven relatively slowly since several complete turns of the screw are necessary to close the valve. In addition, such a valve is relatively expensive because of the metal bellows.

An object of the present invention is to mitigate these drawbacks and to provide a valve which is cheap and which can be driven quickly.

SUMMARY OF THE INVENTION

The present invention thus provides a gastight manually-operated valve comprising a cylindrical valve body including a first orifice and a second orifice, and containing a piston valve-member that is prevented from rotating but that is free to move axially between a closed position closing said first orifice and an open position providing free communication between said first orifice and said second orifice, wherein said body is provided with a control ring surrounding the outside of the valve body, prevented from moving axially, and free to move in rotation, both said control ring and said piston valve member being fitted with at least one pair of axially polarized permanent magnets, with the two magnets in each pair being polarized in opposite directions to each other and extending respectively on two diametrically opposite generator lines of the body or valve member part carrying them.

In a preferred embodiment, said control ring is fitted with two pairs of permanent magnets situated in line with each other on the same generator lines, and with the magnetization directions of the two pairs being opposite to each other.

BRIEF DESCRIPTION OF THE DRAWINGS

Two embodiments of the invention are described below by way of example with reference to the accompanying drawings, in which.

DETAILED DESCRIPTION

Figure 1:
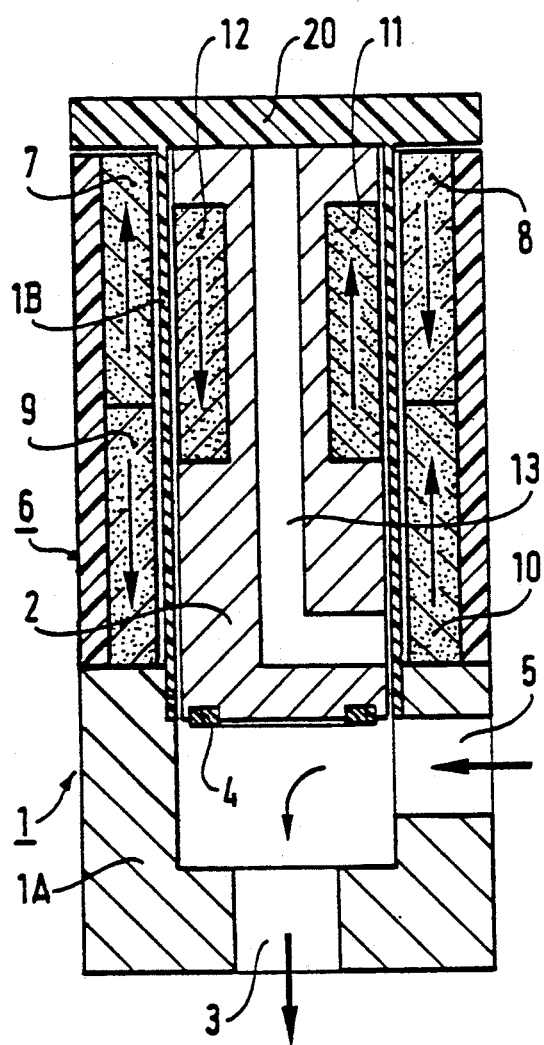
FIG. 1 shows a first embodiment of a valve of the invention in the open position.
Figure 2:
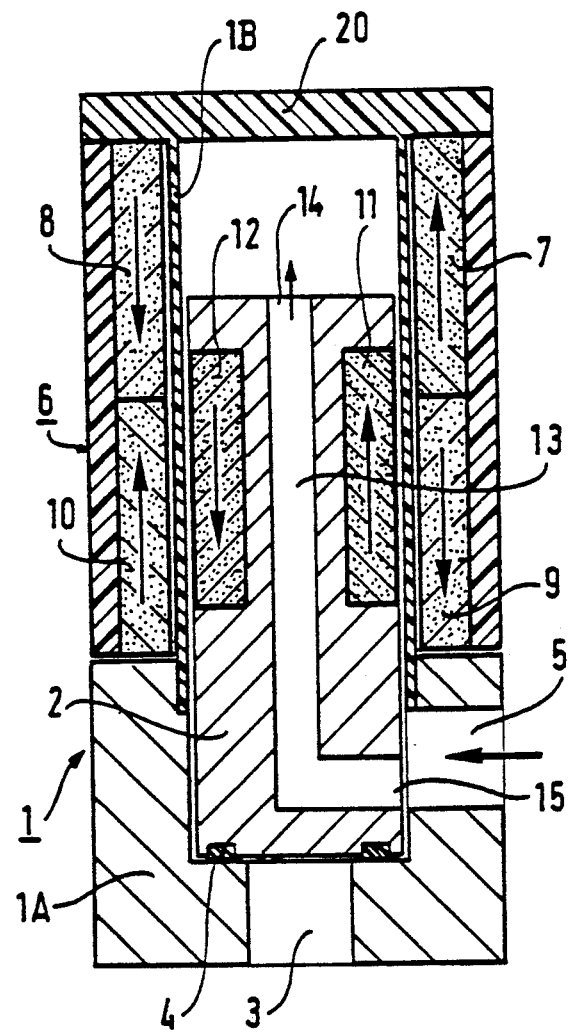
FIG. 2 shows the FIG. 1 valve in the closed position.

Thus, with reference to the figures, a gastight manually controlled valve of the invention can be seen which comprises a cylindrical valve body 1 in which an axially-movable piston valve member 2 is situated. The body includes a first orifice 3 formed in one of the two end faces of the valve body. In the closed position, as shown in FIG. 2, the orifice 3 is closed, with the piston valve member 2 including a sealing ring 4. The valve body 2 includes a second orifice 5 made through the side wall of the valve body. This orifice 5 is situated in such a manner as to be disengaged by the piston valve member 2 when the valve is opened, as shown in FIG. 1. Apart from these two orifices 3 and 5, the valve body is completely closed and there are no moving parts passing therethrough. It comprises two portions 1A and 1B that are assembled together.

Portion 1B of the valve body 1 is provided with a control ring 6 which surrounds the outside of the portion 1B and which is free to rotate. The ring is held in place axially between the portion 1A of the valve body and the end face 20 of the portion 1B of the valve body. The control ring 6 is fitted with a first pair of magnets 7 and 8 that are polarized axially in opposite directions, as shown by the arrows. These two magnets are respectively situated on two diametrically opposite generator lines of the control ring. A second pair of permanent magnets 9 and 10 is disposed above the first pair of magnets. The magnet 9 is polarized in the opposite direction to the magnet 7, while the magnet 10 is polarized in the opposite direction to the magnet 8.

The piston valve member is likewise provided with a pair of permanent magnets 11 and 12 which are likewise polarized axially in opposite directions from each other and which are disposed at 180° relative to each other.

Finally, the valve member 2 is pierced internally by a channel 13 which opens out firstly at 14 to the end of the valve that is opposite its end having the orifice 3, and secondly at 15 through its side wall in the vicinity of the opposite end thereof.

The purpose of the channel 14 is to prevent a "gas cushion" being captured between the end of the valve member and the end 20 of the valve body when the valve is opened, which cushion would escape slowly along the cylindrical side wall of the valve member, thereby retarding full opening of the valve.

The valve is operated by rotating the control ring 6 through half a turn so as to switch between one position and the other: open-closed or closed-open.

In FIG. 1, the pair of magnets 7, 8 attracts the pair 11, 12 of the valve member whereas the pair 9, 10 repels it. In FIG. 2, the pair of magnets 9, 10 attracts the valve member pair 11, 12, whereas the pair 7, 8 repels it.

In the example shown, the control ring 6 includes two pairs of permanent magnets, however that it is not essential, it merely ensures a greater force pressing the valve member against the seat of its closure orifice.

Naturally the portion 1B of the valve body around which the control ring 6 is situated is itself made of non-magnetic material.

Figure 3:
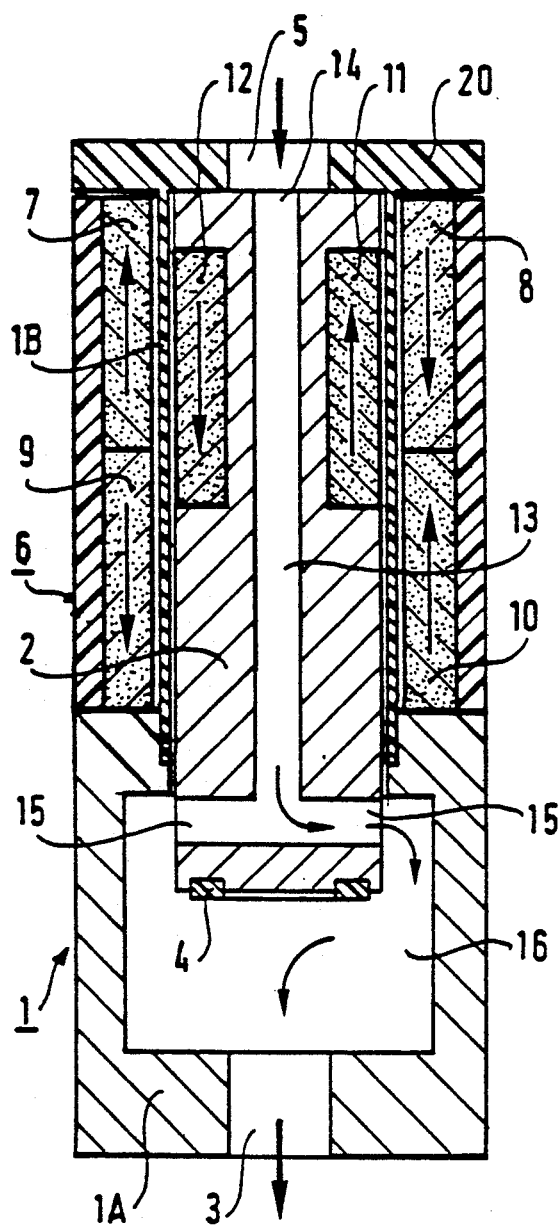
FIGS. 3 and 4 show a second embodiment of a valve of the invention respectively in the open position and in the closed position.
Figure 4:
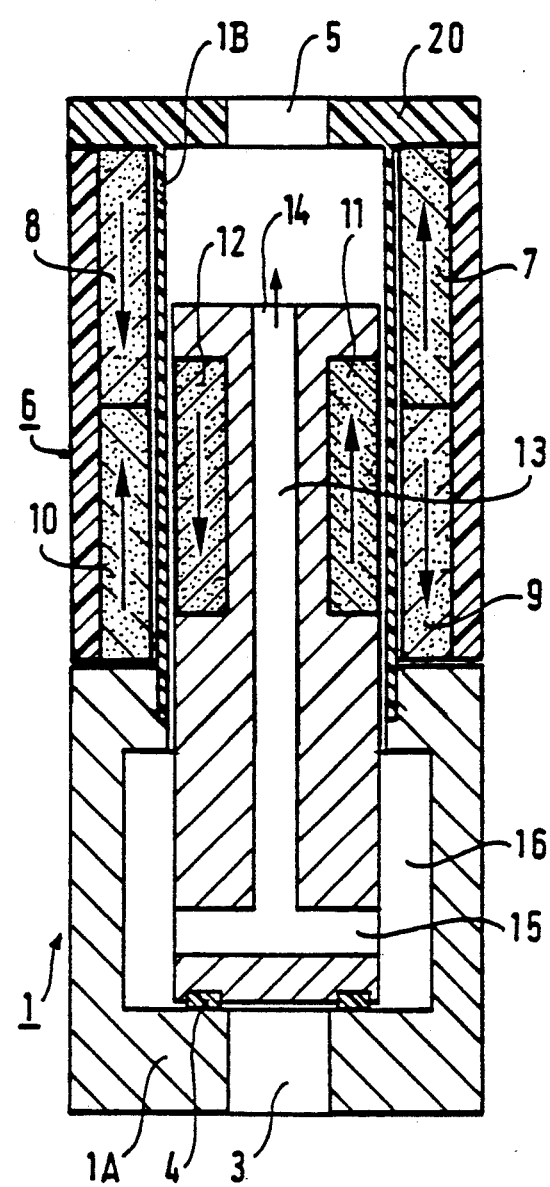

In the variant shown in FIGS. 3 and 4, the orifices 3 and 5 are formed in respective opposite ends of the body 1. In order to provide free communication between the two orifices 3 and 5 when the valve is in its open position, the piston valve member includes an internal channel 13 that opens out firstly at 14 in its end facing the orifice 5, and secondly at 15 in its side wall in the vicinity of its end adjacent to the first orifice 3. The two side orifices 15 open out into an enlarged cavity 16 in the body 1 so as to ensure that the valve has good conductance when in its open position.

I claim:

1. A gastight manually-operated valve comprising a cylindrical valve body having an axis, an axial bore closed at opposite ends by opposed end walls, and defining a cylindrical side wall between said opposite end walls, said cylindrical body further including a first orifice and a second orifice, a cylindrical, axially shiftable standfree piston valve-member sized to said axial bore of said valve body and slidably mounted therein, the axial length of said piston valve member being less than the length of said axial bore of said cylindrical valve body, means for preventing said piston valve member from rotating in said valve body bore but being free to move axially between a closed position closing off said first orifice from said second orifice, and an open position providing free communication between said first orifice and said second orifice, said body being provided with a control ring concentrically surrounding the outside of the valve body, means for preventing said control ring from moving axially, said control ring being free to move in rotation about said axis, one of said control ring and said piston valve member being fitted with at least two pairs of axially polarized permanent magnets, the other of said control ring and said piston valve member being fitted with at least one pair of axially polarized permanent magnets, with the two magnets in each pair being polarized in opposite directions to each other and extending respectively on two diametrically opposite generator lines of the body and valve member part which carry said axially polarized permanent magnets, and wherein the two pairs of axially polarized permanent magnets on said one member are axially stacked with stacked permanent magnets being oppositely polarized such that, as a result of rotation of said control ring on said valve body through a selective half turn, magnetic field interaction causes both repulsion and attractive forces to act on the piston valve member in the same direction to drive the piston valve member quickly between a valve open and a valve closed position and vice versa when an interactive position between the one pair of permanent magnets and the at least two pair of permanent magnets is achieved during the selective half turn rotation of said control ring.

2. A gastight manually-controlled valve according to claim 1, wherein said control ring is fitted with two pairs of permanent magnets situated in line with each other on the same generator lines, and with axial magnetization directions of the two pairs being opposite to each other.

3. A gastight manually-controlled valve according to claim 1, wherein said first orifice is situated in one of said two end walls of said body, said second orifice being situated in the side wall.

4. A gastight manually-controlled valve according to claim 3, wherein said piston valve member includes an internal channel which opens to the outside of the valve member firstly through an end wall situated furthest from said first orifice and secondly through a side wall thereof in the vicinity of an end situated adjacent to said first orifice.

5. A gastight manually-controlled valve according to claim 1, wherein said first orifice is situated in one of the two end walls of said body, and said second orifice is situated in the opposite end wall thereof, said piston valve member having an internal channel which opens to the outside of the valve member firstly through an end wall facing the second orifice and secondly through a side wall thereof in the vicinity of end wall situated adjacent to said first orifice in the axial bore of said body.

6. A gastight manually-operated valve comprising a cylindrical valve body having an axis, an axial bore closed at opposite ends by opposed end walls, and defining a cylindrical side wall between said opposite end walls, said cylindrical body further including a first orifice and a second orifice, a cylindrical, axially shiftable, standfree piston valve-member sized to said axial bore of said valve body and slidably mounted therein, the axial length of said piston valve member being less than the length of said axial bore of said cylindrical valve body, means for preventing said piston valve member from rotating in said valve body bore but being free to move axially between a closed position closing off said first orifice from said second orifice, and an open position providing free communication between said first orifice and said second orifice, said body being provided with a control ring concentrically surrounding the outside of the valve body, means for preventing said control ring from moving axially, said control ring being free to move in rotation about said axis, both of said control ring and said piston valve member being fitted with at least one pair of axially polarized permanent magnets, with the magnets in each pair being polarized in opposite directions to each other and extending respectively on two diametrically opposite generator lines of the body and valve member part which carry said axially polarized permanent magnets, and wherein, as a result of rotation of said control ring on said valve body through a half turn, magnetic field interaction causes selectively repulsion and attraction forces to act on the piston valve member to drive the piston valve member quickly between valve open and valve closed position and vice versa.

* * * * *